(12) United States Patent
Ota et al.

(10) Patent No.: US 10,151,393 B2
(45) Date of Patent: Dec. 11, 2018

(54) METAL GASKET MATERIAL PLATE AND METHOD FOR MANUFACTURING THE SAME

(71) Applicants: NIPPON LEAKLESS INDUSTRY CO., LTD., Minato-ku, Tokyo (JP); HONDA MOTOR CO., LTD., Minato-ku, Tokyo (JP)

(72) Inventors: Satoshi Ota, Saitama (JP); Naomichi Mitsuyama, Saitama (JP); Yosuke Yoshizawa, Wako (JP); Yuji Mitsumori, Wako (JP); Kenji Sasaki, Wako (JP); Masayuki Nakamura, Takasaki (JP); Akihiro Okubo, Takasaki (JP); Akira Masukura, Yokohama (JP); Noriyuki Kitagawa, Yokohama (JP)

(73) Assignees: NIPPON LEAKLESS INDUSTRY CO., LTD., Minato-ku, Tokyo (JP); HONDA MOTOR CO., LTD., Minato-ku, Tokyo (JP)

( * ) Notice: Subject to any disclaimer, the term of this patent is extended or adjusted under 35 U.S.C. 154(b) by 449 days.

(21) Appl. No.: 15/067,416

(22) Filed: Mar. 11, 2016

(65) Prior Publication Data

US 2016/0265661 A1 Sep. 15, 2016

(30) Foreign Application Priority Data

Mar. 12, 2015 (JP) ................. 2015-049763

(51) Int. Cl.
*F16J 15/08* (2006.01)
*F02F 11/00* (2006.01)
(Continued)

(52) U.S. Cl.
CPC ......... *F16J 15/0806* (2013.01); *F02F 11/002* (2013.01); *F16J 15/0818* (2013.01);
(Continued)

(58) Field of Classification Search
CPC .... F16J 15/0806; F16J 15/0818; F16J 15/122; F16J 2015/0856; F16J 2015/085; F02F 11/002; B05D 7/586; B05D 2202/00
See application file for complete search history.

(56) References Cited

FOREIGN PATENT DOCUMENTS

| JP | 2003-185023 A | 7/2003 |
|---|---|---|
| JP | 2008-164122 A | 7/2008 |
| JP | 5545396 B1 | 7/2014 |

OTHER PUBLICATIONS

Feb. 6, 2018, Office Action issued by the State Intellectual Property Office in the corresponding Chinese Patent Application No. 201610140758.4.

(Continued)

*Primary Examiner* — Michael C Miggins
(74) *Attorney, Agent, or Firm* — Kenja IP Law PC

(57) ABSTRACT

A metal gasket material plate includes a sealing layer formed by layering a chemical coating layer, an adhesive layer, and a rubber coating layer in this order on at least one side of a metal plate. The chemical coating layer is formed by a thermosetting surface preparation agent including inorganic compound particles and a metal alkoxide compound. The adhesive layer is formed by an adhesive including an epoxy compound and an anti-corrosive pigment. The rubber coating layer is formed by a rubber agent including rubber.

9 Claims, 9 Drawing Sheets

(51) Int. Cl.
*F16J 15/12* (2006.01)
*B05D 7/00* (2006.01)

(52) U.S. Cl.
CPC ............ *F16J 15/122* (2013.01); *B05D 7/586* (2013.01); *B05D 2202/00* (2013.01); *F16J 2015/085* (2013.01); *F16J 2015/0856* (2013.01)

(56) References Cited

OTHER PUBLICATIONS

Jul. 31, 2017, Office Action issued by the State Intellectual Property Office in the corresponding Chinese Patent Application No. 201610140758.4.

METAL GASKET MATERIAL PLATE AND METHOD FOR MANUFACTURING THE SAME

TECHNICAL FIELD

This disclosure relates to a metal gasket material plate and a method for manufacturing the same.

BACKGROUND

As the material of a metal gasket for use around an automobile engine (for example, for the cylinder heads of the engine), a metal gasket material plate in which a rubber coating layer is disposed on a metal plate is widely used. A gasket formed by processing this metal gasket material plate is often used to seal combustion gas, lubricant oil, and cooling water in the engine.

An example of such a metal gasket material plate is a metal gasket material plate having a layered structure with a pretreatment layer, adhesive layer, and rubber coating layer formed in this order on a metal plate (see JP 2003-185023 A (PTL 1) and JP 2008-164122 A (PTL 2)).

CITATION LIST

Patent Literature

PTL 1: JP 2003-185023 A
PTL 2: JP 2008-164122 A

SUMMARY

The location at which the cylinder head gasket is attached within the engine experiences a large temperature change due to repeated driving and stopping of the engine. As a result of this temperature change, the cooling water also experiences a large temperature change.

When using a gasket that was manufactured from the metal gasket material plate as a cylinder head gasket, a portion directly contacting the cooling water or the like (for example, the rubber coating layer of the metal gasket material plate) may swell and bulge, causing the rubber coating layer to peel from the metal plate.

Examples of portions where the cooling water or the like is directly contacted and the rubber coating layer tends to peel off the metal plate include a band (4d, water jacket) that is between full embossments (4a2) and a half embossment (4a3) in FIGS. 4(A) and 4(B), where passage holes (4b1) through which the cooling water flows are provided.

With the metal gasket material plate disclosed in PTL 1 and PTL 2, the rubber coating layer does not easily peel off due to a temperature change. In recent years, however, there has been increased demand for metal gaskets, for use around engines, that have even greater resistance to temperature changes and that are even less prone to peeling between layers even when used continually in an environment with large temperature changes.

Therefore, it would be helpful to provide a metal gasket material plate in which the rubber coating layer does not easily peel from the metal plate even upon a temperature change (i.e. a metal gasket material plate that has excellent adhesiveness between layers even after a temperature change). It would also be helpful to provide a method for manufacturing a metal gasket material plate that simplifies the production process and achieves excellent productivity.

After extensive study, we discovered that providing a chemical coating layer and an adhesive layer that have a particular composition yields a metal gasket material plate in which the rubber coating layer does not peel easily even upon a temperature change, thereby completing this disclosure.

A metal gasket material plate according to this disclosure includes: a sealing layer formed by layering a chemical coating layer, an adhesive layer, and a rubber coating layer in order at least one side (on one or both sides) of a metal plate, such that the chemical coating layer is formed by a thermosetting surface preparation agent including inorganic compound particles and a metal alkoxide compound, the adhesive layer is a layer with a thickness of 2 μm to 5 μm formed by an adhesive that includes at least one epoxy compound selected from the group consisting of a novolac epoxy compound, a bisphenol A epoxy compound, a bisphenol F epoxy compound, a cresol novolac epoxy compound, a naphthalene epoxy compound, a glycidyl ester epoxy compound, a glycidylamine epoxy compound, a heterocyclic epoxy compound, and a rubber-modified epoxy compound, and at least one anti-corrosive pigment selected from the group consisting of a phosphoric acid anti-corrosive pigment, a molybdic acid anti-corrosive pigment, and a phosphomolybdic acid anti-corrosive pigment, the rubber coating layer is formed by a rubber agent including rubber, an average length of the anti-corrosive pigment is 0.5 μm to 4 μm, and a proportion of the anti-corrosive pigment is 10% to 30% by weight with respect to 100% by weight of the epoxy compound.

A thickness of the chemical coating layer is preferably 1 μm to 2 μm, the inorganic compound particles preferably include at least one type of particle selected from the group consisting of silica, alumina, and titanium, and the metal alkoxide compound preferably includes at least one compound selected from the group consisting of titanate, a silane coupling agent, and aluminate.

The rubber is preferably acrylonitrile butadiene rubber, a thickness of the rubber coating layer is preferably 15 μm to 35 μm, and a universal hardness of the rubber coating layer in an ultra-microhardness tester is preferably 20 N/mm$^2$ to 120 N/mm$^2$.

Anti-corrosive pigment is preferably substantially not included in the rubber coating layer.

A method for manufacturing a metal gasket material plate according to this disclosure includes: forming a chemical coating layer by applying a thermosetting surface preparation agent including inorganic compound particles and a metal alkoxide compound onto at least one side (one or both sides) of a metal plate and then drying and heating the thermosetting surface preparation agent; forming an adhesive layer with a thickness of 2 μm to 5 μm by applying, onto the chemical coating layer, an adhesive that includes at least one epoxy compound selected from the group consisting of a novolac epoxy compound, a bisphenol A epoxy compound, a bisphenol F epoxy compound, a cresol novolac epoxy compound, a naphthalene epoxy compound, a glycidyl ester epoxy compound, a glycidylamine epoxy compound, a heterocyclic epoxy compound, and a rubber-modified epoxy compound, and at least one anti-corrosive pigment selected from the group consisting of a phosphoric acid anti-corrosive pigment, a molybdic acid anti-corrosive pigment, and a phosphomolybdic acid anti-corrosive pigment and then drying and heating the adhesive; and forming a rubber coating layer by applying a rubber agent including rubber onto the adhesive layer and then drying and heating the rubber agent, such that an average length of the anti-corrosive pigment is 0.5 μm to 4 μm, and a proportion of the anti-corrosive pigment is 10% to 30% by weight with respect to 100% by weight of the epoxy compound.

By having the above-described structure, the metal gasket material plate of this disclosure has excellent adhesiveness between layers even after a temperature change, and the rubber coating layer does not easily peel from the metal plate.

DETAILED DESCRIPTION

[Metal Gasket Material Plate]

The metal gasket material plate of this disclosure includes a sealing layer formed by layering a chemical coating layer, an adhesive layer, and a rubber coating layer in this order on one or both sides of a metal plate. In other words, the metal gasket material plate of this disclosure has a layered structure in which a chemical coating layer, an adhesive layer, and a rubber coating layer are layered in this order, so that the layers contact each other, on the surface of a metal plate (one surface or both surfaces).

Figure 1:
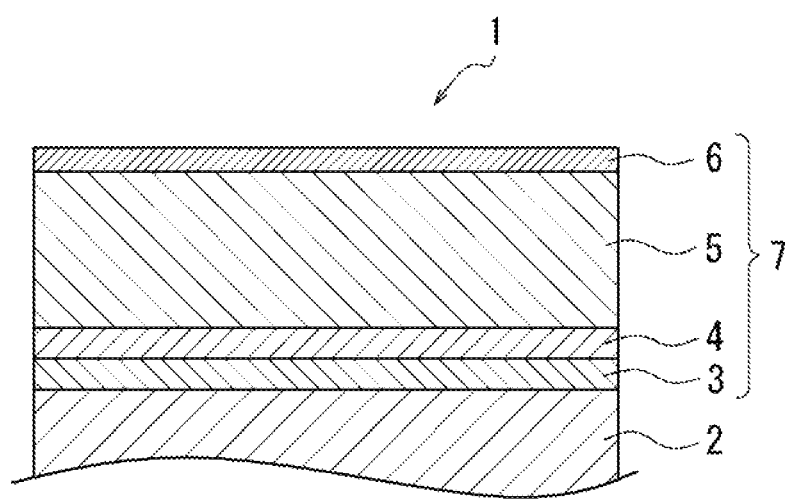
FIG. 1 is a schematic diagram (cross-sectional diagram) illustrating an example of a metal gasket material plate according to this disclosure.

In the sealing layer, other layers such as a lubricant layer may be provided on the rubber coating layer. The metal gasket material plate of this disclosure may, for example as illustrated in FIG. 1, be a metal gasket material plate 1 including, on one surface of a metal plate 2, a sealing layer 7 having a layered structure with a chemical coating layer 3, an adhesive layer 4, a rubber coating layer 5, and a lubricant layer 6.

(Metal Plate)

The metal plate may be any metal plate that can be used for gasket material. Examples include a stainless steel plate, an SPCC steel plate (cold-rolled steel plate), a galvanized steel plate, and an aluminum alloy plate. In particular, in terms of a gasket substrate for a cylinder head, the metal plate is preferably SUS301-H, which is a type of steel in stainless steel plates. Generally, the metal plate as referred to herein is one that has been degreased with an alkaline degreasing agent to remove the oil and fat content, which is a rolling-mill lubricant component on the metal surface. The degreasing treatment is separate from the chemical coating layer used in this disclosure.

The steel plate may have any thickness, but in terms of a gasket substrate for a cylinder head, a thickness of 0.15 mm to 0.30 mm, for example, is preferred.

(Chemical Coating Layer)

The chemical coating layer is a layer formed by a thermosetting surface preparation agent including inorganic compound particles and a metal alkoxide compound. The chemical coating layer is in contact with the metal plate and the adhesive layer.

The inorganic compound particles are not limited. For example, inorganic oxide particles are preferred, and at least one type of particle selected from the group consisting of silica, alumina, and titanium is more preferred. Among these, silica is preferred from the perspective of the adhesion between the metal plate and the adhesive layer. Furthermore, using inorganic compound particles that contain a hydroxyl group (in particular, inorganic oxide particles that contain a hydroxyl group) yields an excellent waterproofing property.

Any metal alkoxide compound may be used. Examples include compounds represented by the formula $M(OR)_n$. In this formula, M is a metallic element, such as an alkali metal, an alkaline earth metal, a transition metal, aluminum, or silicon. Among these, titanium, aluminum, and silicon are preferred. In the above formula, R is an alkyl group (for example, an alkyl group with a carbon number of 1 to 20), and n is an integer from 1 to 20. As the metal alkoxide compound, at least one compound selected from the group consisting of titanate, a silane coupling agent, and aluminate is preferred.

Any thermosetting surface preparation agent may be used, but from the perspective of environmental friendliness, the thermosetting surface preparation agent for example preferably does not include chromium oxide (for example, a hexavalent chromium compound). In particular, as the metal gasket material plate of this disclosure, a completely chromium-free metal gasket material plate that does not include chromium oxide (for example, a hexavalent chromium compound) is preferred.

The thermosetting surface preparation agent may further include a solvent. Any solvent may be included in the thermosetting surface preparation agent. Examples include an organic solvent such as a ketone or toluene solvent.

The thermosetting surface preparation agent may, for example, be prepared by uniformly mixing (mixing by stirring until the solid content concentration is uniform) the inorganic compound particles, the metal alkoxide compound, and a solvent or the like as necessary.

The chemical coating layer may, for example, be formed by applying the thermosetting surface preparation agent onto one or both sides of the metal plate and then performing drying and heating treatment (chemical coating layer formation step). Before application of the thermosetting surface preparation agent, the metal plate is preferably subjected to degreasing treatment with an alkaline degreasing agent. Any method of application may be used. Examples include dipping and using a roll coater, a screen, or a spray. Among these, continuous application (continuous coating) with a roll coater is preferred. Any amount of the thermosetting surface preparation agent may be applied, but the dry coating weight after drying and heating, for example, is preferably 0.1 g/m² to 2.0 g/m².

The drying and heating treatment is not limited but is preferably performed with an oven, for example. The heating treatment includes baking, seizing, vulcanization, and the like. The drying and heating are preferably performed under the conditions of a temperature of 260° C. to 360° C. and a duration of one to five minutes. Due to the drying and heating treatment after application, a condensation reaction occurs between the inorganic compound particles and the metal alkoxide compound, which bind with the metal plate to form the chemical coating layer.

The thickness (thickness on one side) of the chemical coating layer may be any value, but a thickness of 1 µm to 2 µm, for example, is preferred.

(Adhesive Layer)

The adhesive layer is a layer formed by adhesive including an epoxy compound and an anti-corrosive pigment. The adhesive layer is in contact with the chemical coating layer and the rubber coating layer.

The epoxy compound includes at least one type of epoxy compound selected from the group consisting of a novolac epoxy compound, a bisphenol A epoxy compound, a bisphenol F epoxy compound, a cresol novolac epoxy compound, a naphthalene epoxy compound, a glycidyl ester epoxy compound, a glycidylamine epoxy compound, a heterocyclic epoxy compound, and a rubber-modified epoxy compound. Among these, in terms of close adhesion between the rubber coating layer and the chemical coating layer, a bisphenol A epoxy compound is preferred.

In the adhesive, the epoxy component is preferably the main component. The proportion of the epoxy component in the adhesive is not limited but for example is preferably 50% to 90% by weight with respect to the total amount (100% by weight) of the adhesive.

The anti-corrosive pigment is at least one type of anti-corrosive pigment selected from the group consisting of a phosphoric acid anti-corrosive pigment (for example, a zinc phosphate anti-corrosive pigment, a calcium phosphate anti-corrosive pigment, a magnesium phosphate anti-corrosive pigment, an aluminum phosphate anti-corrosive pigment, or the like), a molybdic acid anti-corrosive pigment (for example, a zinc molybdic acid anti-corrosive pigment, a calcium molybdic acid anti-corrosive pigment, a molybdate anti-corrosive pigment, or the like), and a phosphomolybdic acid anti-corrosive pigment (for example, an aluminum phosphomolybdic acid anti-corrosive pigment or the like). A zinc cyanamide anti-corrosive pigment, a zinc anti-corrosive pigment (for example, a zinc powder anti-corrosive pigment, a zinc alloy powder anti-corrosive pigment, or the like), a phosphite anti-corrosive pigment (for example, a zinc phosphite anti-corrosive pigment, a calcium phosphite anti-corrosive pigment, an aluminum phosphite anti-corrosive pigment, a strontium phosphite anti-corrosive pigment, or the like), an aluminum tripolyphosphate anti-corrosive pigment, a borate anti-corrosive pigment, a nitro compound anti-corrosive pigment, and/or a complexing acid anti-corrosive pigment may also be included. Among these, a zinc phosphate anti-corrosive pigment is preferred in that water resistance is expressed the most.

The anti-corrosive pigment may be any shape. Examples include a scaly shape (such as a thin (for example, 0.5 µm to 1.5 µm thick) roughly cuboidal shape, a thin, roughly rectangular parallelepiped, a thin, roughly elliptical cylinder, or the like).

The average length of the anti-corrosive pigment is, for example, preferably 0.5 µm to 33 µm and particularly preferably 0.5 µm to 4.0 µm. The average length is the value measured according to JIS Z8825. By the average length of the anti-corrosive pigment being within the above range, the anti-corrosive pigment can be disposed without gaps in the adhesive layer in plan view, and water resistance improves since the contact surface area between penetrating water and the anti-corrosive pigment increases (in particular, the effects of water resistance and heat cycle resistance in the anti-corrosive pigment are significantly achieved at an average length of 0.5 µm to 4.0 µm (particularly at 3 µm) (see Table 3)). Furthermore, the adhesive layer can be made thinner, and cohesion failure in the adhesive layer can be eliminated.

In particular, the anti-corrosive pigment is preferably a phosphoric acid anti-corrosive pigment (in particular, a zinc phosphate anti-corrosive pigment), a molybdic acid anti-corrosive pigment, or a phosphomolybdic acid anti-corrosive pigment with an average length of 0.5 µm to 4.0 The anti-corrosive pigment may have any thickness, but for example a thickness of 0.5 µm to 1.5 µm is preferred.

The anti-corrosive pigment may be included in any proportion in the adhesive layer, but a proportion of 10% to 40% by weight with respect to the total amount (100% by weight) of the epoxy compound is preferred, and 10% to 30% by weight is more preferred. Setting the proportion of the anti-corrosive pigment within the above range controls the transmission of corrosion factors. Furthermore, anions that are gradually eluted from the anti-corrosive pigment by penetrating moisture react with the metal plate, improving the adhesiveness with the chemical coating layer. Volume expansion and contraction of the adhesive layer and rubber coating layer due to immersion in an electrolyte aqueous solution are also controlled. Peeling and blistering between the metal plate and the chemical coating layer, between the chemical coating layer and the adhesive layer, and between the adhesive layer and the rubber coating layer can thus be controlled. The adhesive layer also has excellent adhesion strength, without becoming brittle, and can achieve a waterproofing effect. In particular, the effect of adhesion strength is significantly obtained at a proportion of 10% to 30% by weight (see Table 4).

A hardening accelerator, solvent, heat resistant reinforcing material, or the like may also be included in the adhesive.

Any hardening accelerator may be used. Examples include a tertiary amine compound such as hexamethylene tetramine, an imidazole derivative, and a phosphine compound.

Any solvent may be included in the adhesive. Examples include organic solvents such as cyclohexanone, methyl ethyl ketone (MEK), toluene, methyl isobutyl ketone (MIBK), or xylene. Among these, from the perspectives of liquid retention of the solvent when drying and burning, volatility, and viscosity (fluidity) of the adhesive, cyclohexanone, methyl ethyl ketone (MEK), and toluene are preferred.

The adhesive may, for example, be prepared by uniformly mixing the epoxy compound, the anti-corrosive pigment, and as necessary, the hardening accelerator, the solvent, and the like.

The adhesive layer may, for example, be formed by applying the adhesive on the chemical coating layer and then subjecting the adhesive to drying and heating treatment (adhesive layer formation step). Any method of application may be used. Examples include using a roll coater, a screen, or a spray. Among these, continuous application (continuous coating) with a roll coater is preferred. The drying and heating treatment is not limited but, for example, is preferably performed with an oven, hot-air drying, infrared radiation, far-infrared radiation, or the like. The drying and heating are preferably performed under the conditions of a temperature of 200° C. to 300° C. (preferably 250° C. to 300° C.) and a duration of one to five minutes.

The thickness (thickness on one side) of the adhesive layer may be any value, but for example a thickness of 1 μm to 7 μm is preferred, and 2 μm to 5 μm is more preferred. In particular, the adhesive layer is preferably formed to a thickness of 1 μm to 5 μm (particularly 2 μm to 5 μm) using adhesive in which the proportion of the anti-corrosive pigment is 10% to 30% by weight with respect to the total amount (100% by weight) of the epoxy compound.

(Rubber Coating Layer)

The rubber coating layer is a layer formed by a rubber agent including rubber. The rubber coating layer is in contact with the adhesive layer. The rubber coating layer may be in contact with the adhesive layer and the lubricant layer. The rubber coating layer may be the surface layer of the metal gasket material plate (or the sealing layer).

The rubber is not limited, and examples include nitrile rubber (acrylonitrile butadiene (NBR) rubber, such as a copolymer of acrylonitrile and 1,3-butadiene or the like), hydrogenated nitrile rubber (H-NBR rubber or hydrogenated nitrile rubber, such as nitrile rubber with a hydrogenation rate of 80% or greater or the like), styrene-butadiene rubber (SBR rubber), fluoro-rubber (FKM rubber), acrylic rubber, and a mixture thereof. Among these, NBR rubber and H-NBR rubber are preferred.

The above-mentioned rubber is preferably the main component in the rubber agent. The proportion of the rubber in the rubber agent is not limited but for example is preferably 35% to 60% by weight with respect to the total amount (100% by weight) of the rubber agent.

A compounding agent (a vulcanizing agent, a vulcanizing accelerator, an age inhibitor, an inorganic filler, or the like), a solvent, or the like may be further included in the rubber agent.

Examples of the inorganic filler include carbon black, silica, talc, and clay. The proportion of the inorganic filler is not limited but is preferably 10% to 100% by weight with respect to the total amount (100% by weight) of the rubber.

Examples of the solvent in the rubber agent include ketones, cyclohexanone, methyl ethyl ketone, xylene, methyl isobutyl ketone, toluene, and the like. Among these, cyclohexanone and methyl ethyl ketone are preferred.

Preferably, the anti-corrosive pigment is substantially not included in the rubber agent. Preferably, the anti-corrosive pigment is also substantially not included in the rubber coating layer. "Substantially not included" refers to not being actively blended in, except for unavoidable impurities.

The rubber agent may, for example, be prepared by uniformly mixing (mixing by stirring until the solid content concentration is uniform) the rubber, and as necessary, the compounding agent, the solvent, and the like.

The solid content concentration in the rubber agent may be any value, such as 4% to 20% by weight.

The rubber coating layer may, for example, be formed by applying the rubber agent on the adhesive layer and then subjecting the rubber agent to drying and heating treatment (rubber coating layer formation step). Any method of application may be used. Examples include using a roll coater, a screen, or a spray. Among these, continuous application (continuous coating) with a roll coater is preferred. The drying and heating treatment (vulcanization) is not limited, but for example is preferably performed with an oven, hot-air drying, infrared radiation, far-infrared radiation, or the like. The drying and heating are preferably performed under the conditions of a temperature of 200° C. to 300° C. and a duration of one to five minutes.

The thickness (thickness on one side) of the rubber coating layer may be any value, but a thickness of 15 μm to 35 μm for example, is preferred. Setting the thickness of the rubber coating layer within the above range yields excellent combustion gas sealing performance and wear resistance due to thermal fluctuation (fretting performance). The thickness of the rubber coating layer may, for example, be adjusted in accordance with the conditions of the heating treatment or the like.

The universal hardness of the rubber coating layer in an ultra-microhardness tester may be any value. For example, a value of 20 $N/mm^2$ to 140 $N/mm^2$ is preferred, 20 $N/mm^2$ to 120 $N/mm^2$ is more preferred, 60 $N/mm^2$ to 120 $N/mm^2$ is even more preferred, and 80 $N/mm^2$ to 120 $N/mm^2$ is particularly preferred. Setting the universal hardness within the above range yields excellent combustion gas sealing performance and wear resistance due to thermal fluctuation (fretting performance). In this disclosure, the universal hardness is the value measured in conformity with JIS Z2255 using an ultra-microhardness tester. The universal hardness of the rubber coating layer may, for example, be adjusted in accordance with the type of rubber, the conditions of the heating treatment, or the like.

The rubber coating layer is particularly preferably formed from a rubber agent including NBR rubber and/or H-NBR rubber to a thickness of 15 μm to 35 μm and a universal hardness of 20 $N/mm^2$ to 120 $N/mm^2$.

(Lubricant Layer)

The lubricant layer is a layer formed on the rubber coating layer with a lubricant composition. The lubricant layer is preferably in contact with the rubber coating layer. The lubricant layer may be the surface layer of the metal gasket material plate (or the sealing layer). Providing the lubricant layer achieves prevention of seizing, prevention of deposits, prevention of blocking, and even better wear resistance through improved lubricity.

The lubricant composition is not limited, but for example preferably includes at least a lubricant and a solvent.

Any lubricant may be used. Examples include graphite, paraffin wax, and polytetrafluoroethylene (PTFE). Among these, polytetrafluoroethylene is preferred. Any solvent may be used in the lubricant composition. Examples include water and other solvents.

The lubricant composition may, for example, be prepared by uniformly mixing the lubricant, the solvent, and the like.

The lubricant layer may, for example, be formed by applying the lubricant composition on the rubber coating layer and then subjecting the lubricant composition to drying and heating treatment (lubricant layer formation step). Any method of application may be used. Examples include using a roll coater or a spray. The drying and heating are preferably performed under the conditions of a temperature of 100° C. to 200° C.

The thickness (thickness on one side) of the lubricant layer may be any value, but a thickness of 0.5 μm to 3 μm for example, is preferred. In particular, the lubricant layer is preferably a layer formed from a lubricant composition including PTFE and having a thickness of 0.5 μm to 3 μm.

[Method for Manufacturing Metal Gasket Material Plate]

A method, according to this disclosure, for manufacturing a metal gasket material plate preferably at least includes forming a chemical coating layer by applying the above-described thermosetting surface preparation agent including the above-described inorganic compound particles and the above-described metal alkoxide compound onto one or both sides of the above-described metal plate and then drying and heating the thermosetting surface preparation agent; forming an adhesive layer by applying, onto the chemical coating layer, the above-described adhesive that includes the above-described epoxy compound and then drying and heating the adhesive; and forming a rubber coating layer by applying the above-described rubber agent including the above-described rubber onto the adhesive layer and then drying and heating the rubber agent. The method may further include forming a lubricant layer by applying a lubricant composition including the above-described lubricant onto the rubber coating layer and then drying and heating the lubricant composition.

Among methods according to this disclosure, a manufacturing method including the following steps is preferred.
1) The above-described metal plate is subjected to alkaline degreasing and dried.
2) The above-described thermosetting surface preparation agent, into which the above-described inorganic compound particles and metal alkoxide compound are blended, is applied onto one or both sides of the metal plate.
3) A chemical coating layer is formed by drying and heating the thermosetting surface preparation agent.
4) The above-described adhesive that includes the above-described epoxy compound is applied onto the chemical coating layer.
5) An adhesive layer is formed by drying and heating the adhesive.
6) The above-described rubber agent that includes the above-described rubber (for example, NBR rubber) is applied onto the adhesive layer.
7) A rubber coating layer is formed by drying and heating (vulcanizing) the above-described rubber agent.

Subsequently, a lubricant layer may be formed as necessary by applying the above-described lubricant composition that includes a lubricant onto the rubber coating layer and then drying and heating the lubricant composition. As used herein, heating also refers to baking, burning, vulcanization, and the like.

In particular, with a continuous coating method using a roll coater, the metal gasket material plate can be obtained even more efficiently by continuously disposing the chemical coating layer, the adhesive layer, the rubber coating layer, and as necessary the lubricant layer on the metal plate.

The metal gasket material plate of this disclosure may, for example, be used around an internal combustion engine (for example, for cylinder heads in an automobile, for cylinder heads in a motorcycle, or the like).

By performing heating treatment in the step to form the chemical coating layer, a condensation reaction occurs between the inorganic compound particles and the metal alkoxide compound, so that the chemical coating layer binds with the metal plate in the metal gasket material plate of this disclosure. Therefore, the chemical coating layer adheres firmly to the metal plate, yielding excellent interlayer adhesion upon a temperature change.

Furthermore, the anti-corrosive pigment included in the adhesive layer controls the transmission of corrosion factors, and anions that are gradually eluted from the anti-corrosive pigment by penetrating moisture react with the metal plate, forming a chemical coating layer with good adhesiveness. Additionally, volume expansion and contraction of the adhesive layer and rubber coating layer due to immersion in an electrolyte aqueous solution are also controlled. Peeling and blistering between layers (between the metal plate and the chemical coating layer, between the chemical coating layer and the adhesive layer, and between the adhesive layer and the rubber coating layer) can thus be controlled, yielding excellent adhesiveness between layers.

In particular, by setting the thickness of the chemical coating layer to 1 μm to 2 μm and the content of the anti-corrosive pigment in the adhesive to 10% to 30% by weight with respect to the total amount (100% by weight) of the epoxy compound, the resistance to peeling between the metal plate and the chemical coating layer and between the adhesive layer and the rubber coating layer further improves.

The metal gasket material plate of this disclosure may, for example, also have excellent cooling water resistance (antifreeze resistance, LLC resistance, and the like), oil resistance (for example, lubricant oil resistance), and fuel oil resistance. For example, the metal gasket material plate may also have excellent resistance to an electrolyte aqueous solution such as salt water. Therefore, even when used at locations where cooling water, representative examples of which are antifreeze and LLC, and an electrolyte aqueous solution such as salt water are present, peeling and bulging (blistering) between the metal plate, chemical coating layer, adhesive layer, and rubber coating layer do not easily occur. Furthermore, the metal gasket material plate may have excellent resistance to fretting between bonding surfaces of the engine and the gasket.

When the rubber coating layer does not include any anti-corrosive material, and the anti-corrosive pigment is only included in the adhesive layer, then a strong sealing performance is obtained, and even upon use at locations where cooling water or electrolyte aqueous solution is present, peeling or blistering between layers is even less likely to occur. Costs are also further reduced. Furthermore, blending of components into the rubber compound in order to improve the sealing function of the metal gasket may be examined freely without consideration of the anti-corrosive pigment, thus making it easier to improve the rubber compound.

In particular, by setting the proportion of the anti-corrosive pigment in the adhesive agent to be 10% to 30% by weight, using anti-corrosive pigment with an average length of 0.5 μm to 4 μm, and setting the thickness of the adhesive layer to 2 μm to 5 μm better obtains the effect yielded by not including anti-corrosive pigment in the rubber coating layer but rather only in the adhesive layer.

Figure 4A:
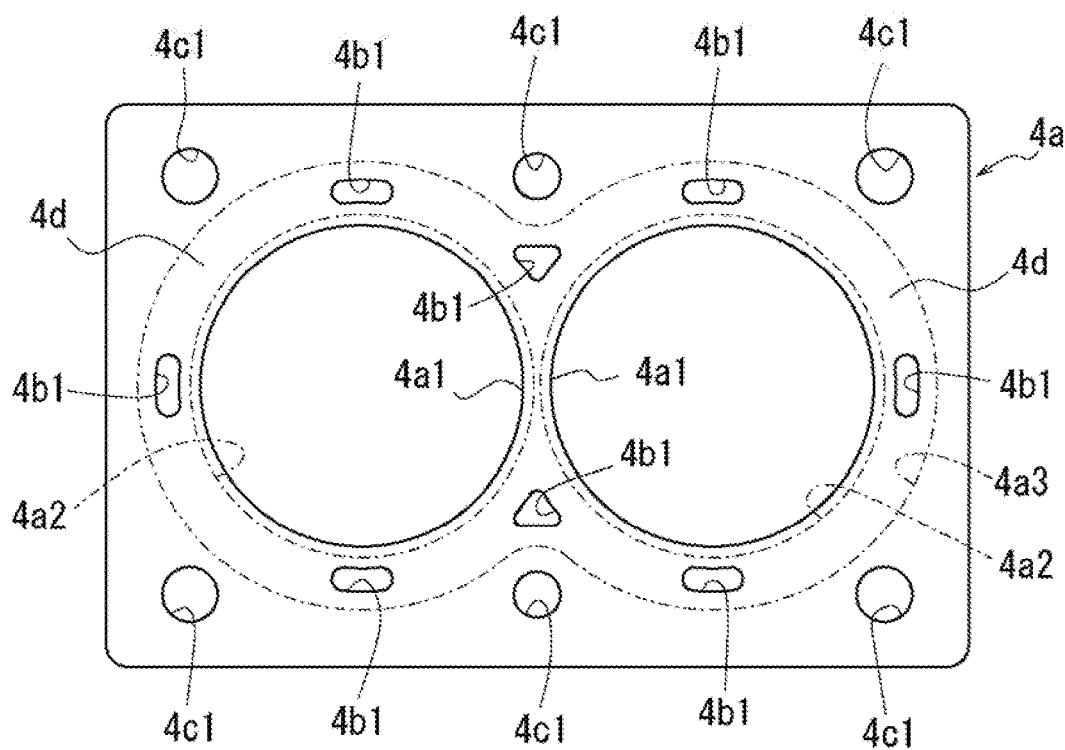
FIGS. 4(A) and 4(B) illustrate a heat cycle test, FIG. 4(A) being a schematic diagram (plan view) representing the shape of the metal gasket material plate, and FIG. 4(B) being an expanded view (cross-sectional diagram) of a portion around a passage hole (4b1) in the metal gasket material plate.
Figure 4B:
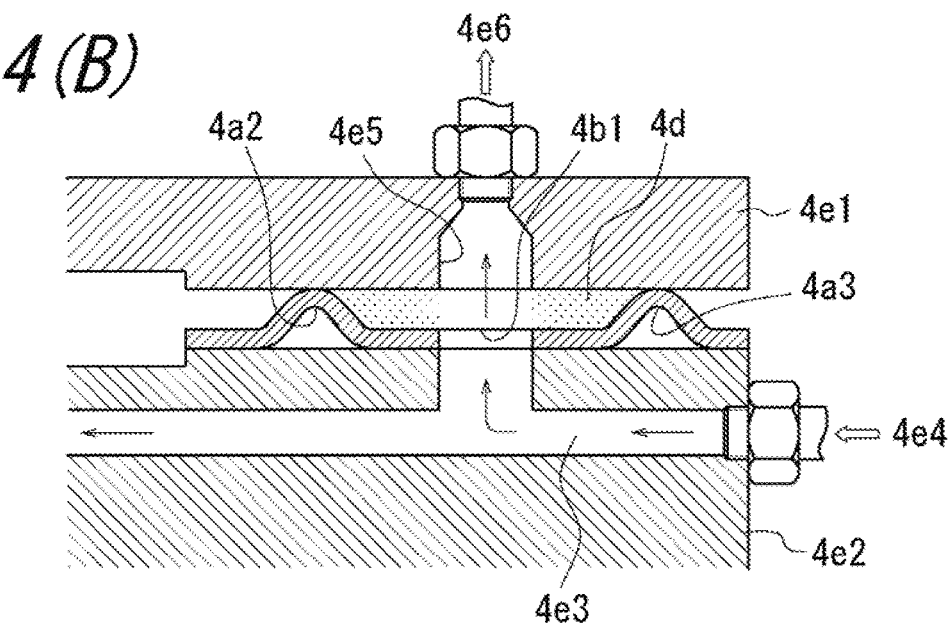

According to the metal gasket material plate of this disclosure, even under direct contact with cooling water when the engine is running, the rubber coating layer does not tend to peel, in particular in a band in which peeling of the rubber coating layer easily occurs (the band 4d in FIGS. 4(A) and 4(B)).

The method of this disclosure for manufacturing a metal gasket material plate simplifies the production process and achieves excellent productivity.

EXAMPLES

The following describes the metal gasket material plates and methods of this disclosure in greater detail based on Examples. This disclosure is not, however, limited by these Examples.

Examples 1 to 3, Comparative Examples 1 to 4

Inorganic compound particles, a metal alkoxide compound, and a solvent were uniformly mixed to prepare a thermosetting surface preparation agent I.

To prepare an adhesive I, 100 parts by weight of an epoxy compound, 20 parts by weight of anti-corrosive pigment with an average length of 3 μm, and a solvent were uniformly mixed.

Rubber, carbon black, a vulcanizing agent, and a solvent were uniformly mixed to prepare a rubber agent I.

The film thickness of the adhesive layer was varied as listed in Table 1.

Degreasing treatment was performed on a metal plate (SUS-301-H, in the shape of a strip with a thickness of 0.20 mm, length of 500 mm, and width of 200 mm, manufactured by Sumitomo Metal Industries) using an alkaline degreasing agent (product name "Surf Cleaner 155", manufactured by Nippon Paint Co.). The thermosetting surface preparation agent I was applied onto one side of the metal plate using a roll coater and then dried and heated under the conditions of a temperature of 300° C. and a duration of one minute to form a chemical coating layer with a thickness in a range of 1 μm to 2 μm.

The adhesive I was applied onto the chemical coating layer and then dried and heated under the conditions of a temperature of 250° C. and a duration of two minutes to form adhesive layers with a thickness of 1 μm, 2 μm, 3 μm, 5 μm, 7 μm, 9 μm, and 20 μm. An adhesive layer with a thickness of 0.5 μm could not be produced.

The rubber agent I was applied onto the adhesive layer and then dried and heated under the conditions of a temperature of 250° C. and a duration of two minutes to form a rubber coating layer with a thickness of 20 μm (universal hardness of 100 N/mm$^2$). Seven types of metal gasket material plates 1-7 each having an adhesive layer with a different thickness were thus prepared. Using the seven types of metal gasket material plates 1 to 7, the adhesion strength was measured with the following adhesion strength test.

When performing the following adhesion strength test using the metal gasket material plates 1 to 7, instant adhesive needs to be dripped onto the test sides, which are then overlapped and sufficiently adhered by finger pressure. A lubricant layer is therefore unnecessary on the rubber coating layer. Hence, a lubricant formed by a lubricant composition containing polytetrafluoroethylene was not applied.

(Adhesion Strength Test)

Figure 3A:
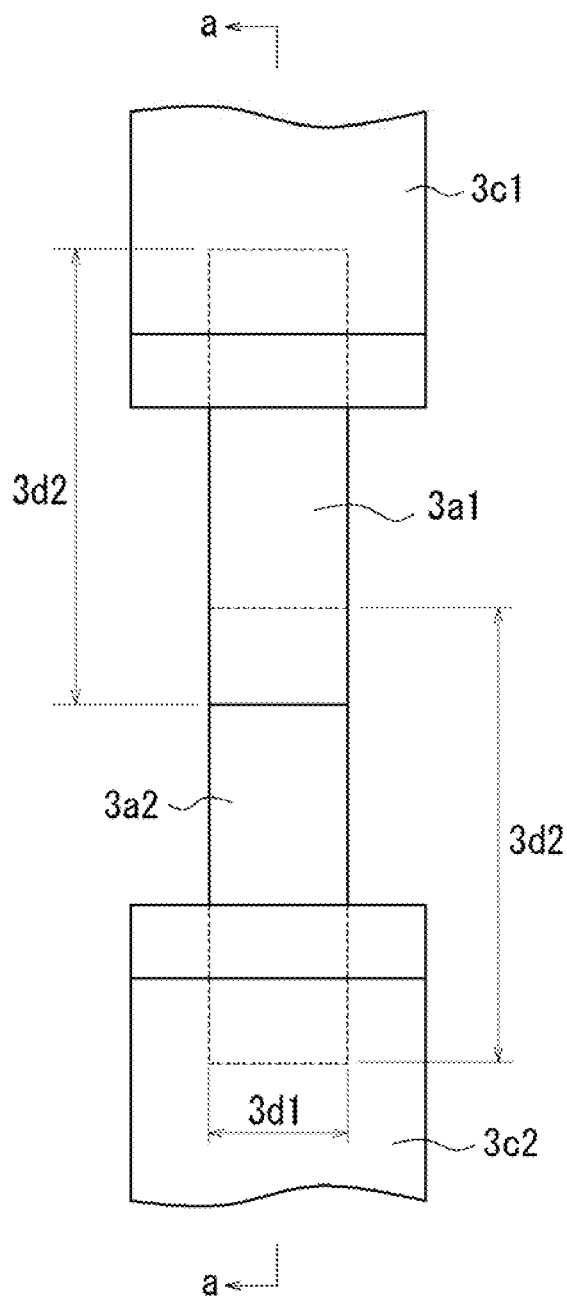
FIGS. 3(A) and 3(B) illustrate an adhesion strength test, FIG. 3(A) being a plan view and FIG. 3(B) being a cross-sectional diagram along the a-a line in FIG. 3(A)
Figure 3B:
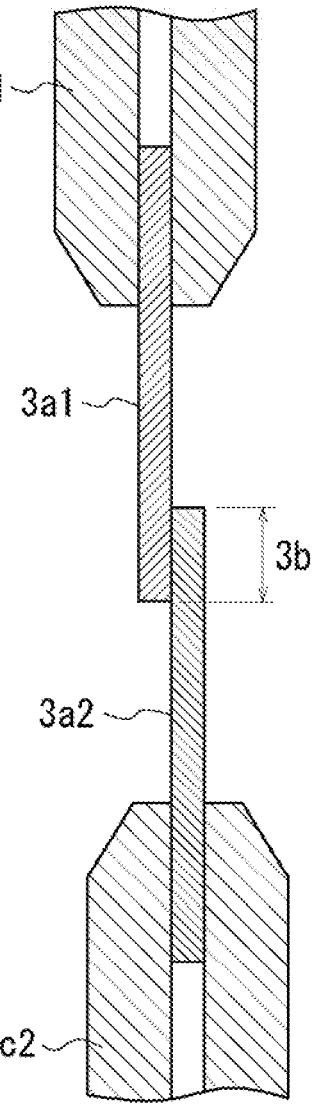

As illustrated in FIGS. 3(A) and 3(B), samples were set in place. Specifically, two metal gasket material plates in which the thickness of the adhesive layer was the same (3a1, 3a2) were cut to a width (3d1) of 15 mm and length (3d2) of 75 mm. Instant adhesive was dripped over the entire surface of a 10 mm long bonding portion (3b), and the two metal gasket material plates (3a1, 3a2) were overlapped and adhered so that the rubber coating layers thereof were in contact at the bonding portion (3b). Subsequently, the bonding portion (3b) was fixed by being sandwiched between set jigs (3c1, 3c2).

After being left at rest for eight hours, the two metal gasket material plates (3a1, 3a2) were pulled in the direction of the arrow in FIG. 3(B) using a tension tester (product name "AG-100KN", manufactured by Shimadzu). The load immediately after the two metal gasket material plates (3a1, 3a2) peeled apart was taken as the adhesion strength (units: MPa), which was evaluated by the following standards.

For use in or around an internal combustion engine (such as for cylinder heads in an automobile), the adhesion strength is preferably 15 MPa or greater. Ensuring adhesion strength of 15 MPa was thus set as the goal. Examples with adhesion strength of 15 MPa or greater were evaluated as good, and those with less than 15 MPa as poor. Only good products were considered acceptable. Table 1 lists the evaluation results.

TABLE 1

| | Metal gasket material plate number | Chemical coating layer film thickness (μm) | Adhesive layer | | | Rubber coating layer | | | Test results adhesion strength |
| --- | --- | --- | --- | --- | --- | --- | --- | --- | --- |
| | | | average length of anti-corrosive pigment (μm) | amount of anti-corrosive pigment (% by weight) | film thickness (μm) | film thickness (μm) | hardness (N/mm$^2$) | Lubricant layer | |
| Comparative Example 1 | 1 | 1-2 | 3 | 20 | 1 | 20 | 100 | none | poor |
| Example 1 | 2 | 1-2 | 3 | 20 | 2 | 20 | 100 | none | good |
| Example 2 | 3 | 1-2 | 3 | 20 | 3 | 20 | 100 | none | good |
| Example 3 | 4 | 1-2 | 3 | 20 | 5 | 20 | 100 | none | good |
| Comparative Example 2 | 5 | 1-2 | 3 | 20 | 7 | 20 | 100 | none | poor |
| Comparative Example 3 | 6 | 1-2 | 3 | 20 | 9 | 20 | 100 | none | poor |
| Comparative Example 4 | 7 | 1-2 | 3 | 20 | 20 | 20 | 100 | none | poor |

Figure 6:
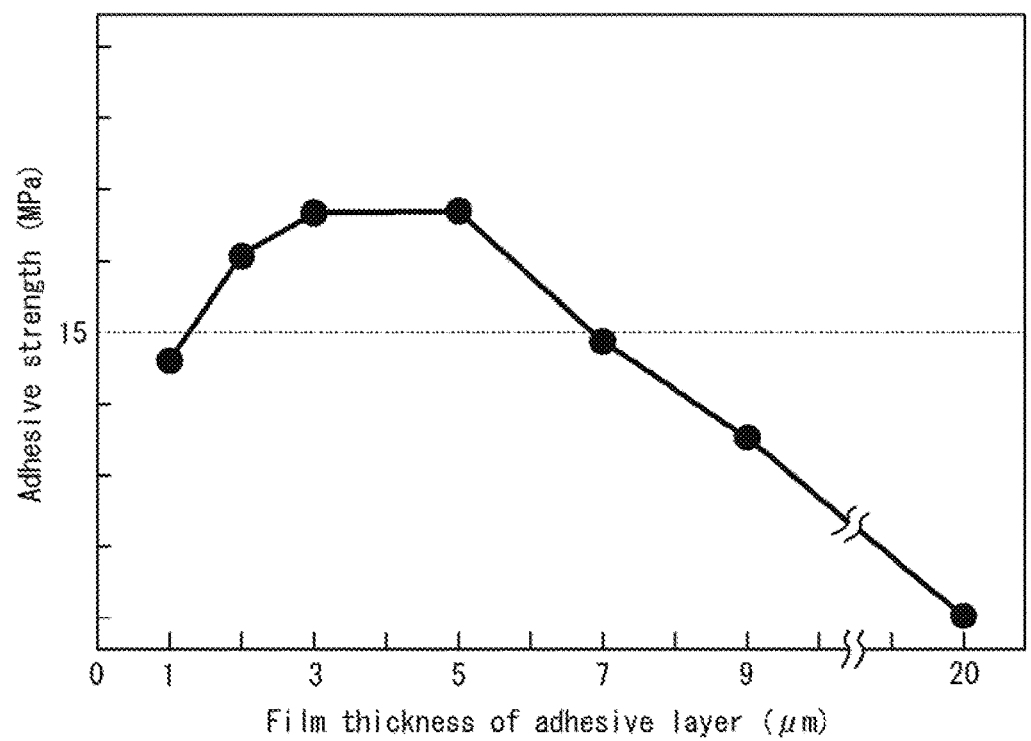
FIG. 6 is a graph of the results of an adhesion strength test on metal gasket material plates 1 to 7.

Excellent adhesiveness was exhibited when the thickness of the adhesive layer was in a range of 2 μm to 5 μm, as the adhesion strength in the adhesion strength test was 15 MPa or greater (see FIG. 6). At a thickness of 7 μm, the adhesion strength was lower than at a thickness of 5 μm. The adhesive layer with a thickness of 1 μm was too thin to sufficiently obtain the effect of the adhesive, and sufficient adhesiveness could not be achieved. Upon exceeding 7 μm, as the thickness of the adhesive layer increased, the adhesion strength decreased.

Confirming a fracture surface of a 9 μm and a 20 μm test piece after performing an adhesion strength test revealed that as the film thickness increases, cohesion failure within the adhesive occurs. It was thus thought that the adhesion strength reduced due to stress within the adhesive being inferior to the strength of the adhesive interface with the chemical coating layer and the rubber coating layer. FIG. 6 illustrates the test results.

Examples 4 to 5, Comparative Examples 5 to 7

Three types of metal gasket material plates 8 to 10 each having anti-corrosive pigment with a different average length were prepared in a similar way to Example 1, except that the thickness of the adhesive layer was in a range of 2 μm to 5 μm (adhesive layer formed to have a thickness in a range of 2 μm to 5 μm (average of approximately 3 μm)), and three types of anti-corrosive pigments with respective average lengths of 3 μm, 25 μm, and 40 μm were used. Using the three types of metal gasket material plates 8 to 10, the adhesion strength was measured with the above-described adhesion strength test. The standard for evaluation was the same as above. Table 2 lists the evaluation results.

the full embossments (4a2) and a step embossment (4a3)); a half embossment (i.e. step embossment) (4a3) completely surrounding the passage holes (4b1); and a plurality of clamping bolt holes (4c1) disposed between the half embossment (4a3) and the outer perimeter of the metal gasket material plate (4a).

TABLE 2

| | | Chemical | Adhesive layer | | | Rubber coating layer | | | | |
|---|---|---|---|---|---|---|---|---|---|---|
| | Metal gasket material plate number | coating layer film thickness (μm) | average length of anti-corrosive pigment (μm) | amount of anti-corrosive pigment (% by weight) | film thickness (μm) | film thickness (μm) | hardness (N/mm²) | Lubricant layer | Test results adhesion strength |
| Example 4 | 8 | 1-2 | 3 | 20 | 2-5 | 20 | 100 | none | good |
| Comparative Example 5 | 9 | 1-2 | 25 | 20 | 2-5 | 20 | 100 | none | good |
| Comparative Example 6 | 10 | 1-2 | 40 | 20 | 2-5 | 20 | 100 | none | poor |

Figure 7:
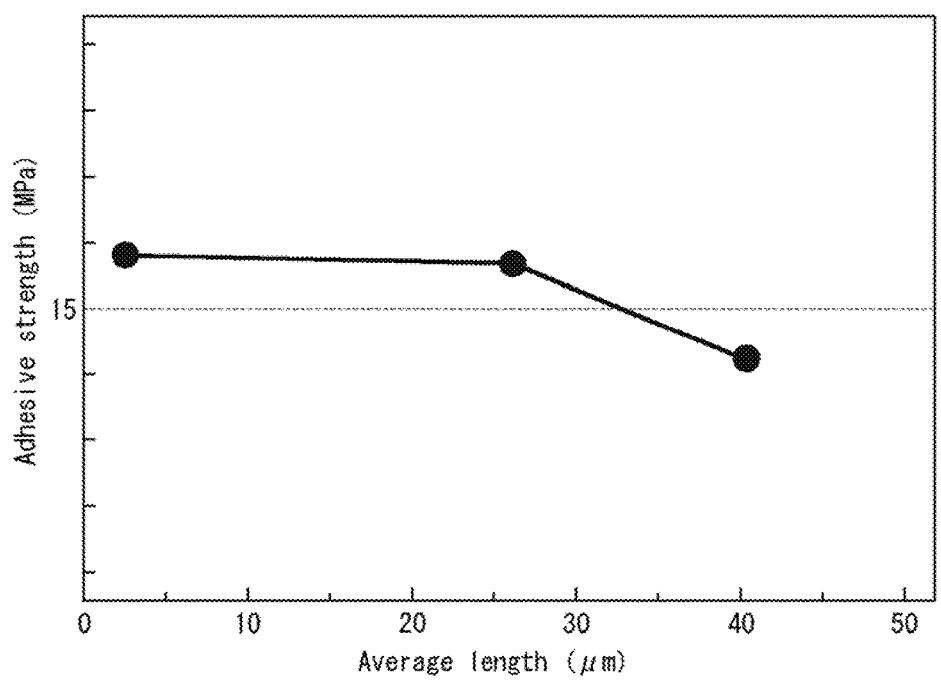
FIG. 7 is a graph of the results of an adhesion strength test on metal gasket material plates 8 to 10.

The metal gasket material plates with the anti-corrosive pigment having an average length of 3 μm and 25 μm exhibited good adhesion strength (see FIG. 7). In particular, the adhesion strength was excellent for the anti-corrosive pigment with an average length of 3 μm. FIG. 7 illustrates these results.

In order to examine metal gasket material plates that, in addition to excellent adhesion strength, also have excellent resistance to cooling water and the like (water resistance and cooling water resistance), the heat cycle resistance was examined using two types of metal gasket material plates including anti-corrosive pigment with an average length of 3 μm and 25 μm.

In order to absorb the expansion and contraction of a dummy cylinder block and a dummy cylinder head during repeated heating and cooling when performing the heat cycle test, two types of metal gasket material plates, labeled metal gasket material plates 11 and 12, were prepared by providing a lubricant layer (with a thickness in a range of 0.5 μm to 3 μm), formed from a lubricant composition including polytetrafluoroethylene, on the rubber coating layer of the two types of metal gasket material plates 8 and 9 with the average length of 3 μm and 25 μm. Using these two types of metal gasket material plates, the following heat cycle test was performed.

Using the two types of metal gasket material plates 11 and 12, it was confirmed with the following heat cycle test whether peeling and blistering occurred between the metal plate and the chemical coating layer, between the chemical coating layer and the adhesive layer, and between the adhesive layer and the rubber coating layer.

(Heat Cycle Test)

The metal gasket material plate (4a) cut out into the predetermined cylinder head gasket shape illustrated in FIG. 4(A) includes two cylinder holes (4a1); two annular full embossments (angle embossments) (4a2) respectively surrounding the cylinder holes (4a1); a plurality of passage holes (4b1), for cooling water and vapor, disposed around the full embossments (4a2) (in a band (4d) surrounded by As illustrated in FIG. 4(B), the tester is structured so that vapor and cooling water flowing in through a vapor and cooling water inlet (4e4) pass through an opening (4e3) in an open state into the passage holes (4b1) of the metal gasket material plate, then through an opening (4e5) to be ejected from an outlet (4e6). The metal gasket material plate (4a) was disposed between a cylinder head (4e1) and a cylinder block (4e2) so that the band (4d) in the metal gasket material plate (4a) matched the opening (4e3) and so that the passage holes (4b1) matched the opening (4e5). The clamping bolts that fasten the cylinder head (4e1) and the cylinder block (4e2) were fastened via the bolt holes (4c1) with a bolt axial force of 10 N·m. In this state, a cycle of alternately supplying cooling water and vapor that was introduced from the boiler through the passage holes (4b1) for five minutes each was repeated 500 times, after which the occurrence of peeling and blistering in the sealing layer of the vapor passage portion (band 4d) sandwiched between the full embossments (4a2) and the half embossment (4a3) around the cylinder holes (4a1) was confirmed visually.

The cylinder head (4e1) has a closed shape, and the cylinder block (4e2) has an open shape.

The heat cycle resistance of the metal gasket material plate (4a) was evaluated with the following standard using the metal gasket material plates 11 and 12.

Good heat cycle resistance: no peeling or blistering between the metal plate and the chemical coating layer, between the chemical coating layer and the adhesive layer, or between the adhesive layer and the rubber coating layer Poor heat cycle resistance: peeling and blistering confirmed between the metal plate and the chemical coating layer, between the chemical coating layer and the adhesive layer, or between the adhesive layer and the rubber coating layer For use in or around an internal combustion engine (such as for cylinder heads in an automobile), peeling and blistering preferably do not occur in the above-described test. Table 3 lists the evaluation results.

TABLE 3

| | Metal gasket material plate number | Chemical coating layer film thickness (μm) | Adhesive layer average length of anti-corrosive pigment (μm) | Adhesive layer amount of anti-corrosive pigment (% by weight) | Adhesive layer film thickness (μm) | Rubber coating layer film thickness (μm) | Rubber coating layer hardness (N/mm²) | Lubricant layer | Test results heat cycle resistance |
|---|---|---|---|---|---|---|---|---|---|
| Example 5 | 11 | 1-2 | 3 | 20 | 2-5 | 20 | 100 | included | good |
| Comparative Example 7 | 12 | 1-2 | 25 | 20 | 2-5 | 20 | 100 | included | poor |

When the average length of the anti-corrosive pigment was 3 μm, no peeling or blistering between layers was observed, and both the heat cycle resistance and water resistance were excellent. When the average length was 25 μm, peeling and blistering between layers were observed.

Examples 6 to 8, Comparative Examples 8 to 10

Six types of metal gasket material plates 13 to 18 each having a different proportion of anti-corrosive pigment in the adhesive were prepared in a similar way to Example 1, except that the thickness of the adhesive layer was in a range of 2 μm to 5 μm (adhesive layer formed to have a thickness in a range of 2 μm to 5 μm (average of approximately 3 μm)), anti-corrosive pigment with an average length of 3 μm was used, and adhesives with six different proportions of the anti-corrosive pigment in the adhesive with respect to 100 parts by weight (100% by weight) of the epoxy compound were used: 3 parts by weight (3% by weight), 10 parts by weight (10% by weight), 18 parts by weight (18% by weight), 30 parts by weight (30% by weight), 48 parts by weight (48% by weight), and 60 parts by weight (60% by weight). Using the six types of metal gasket material plates 13 to 18, the adhesion strength was measured with the above-described adhesion strength test. The standard for evaluation was the same as above. As in the above examples, since an adhesion strength test was performed, no lubricant layer was applied.

For use in or around an internal combustion engine (such as for cylinder heads in an automobile), the adhesion strength is preferably 15 MPa or greater. Table 4 lists the evaluation results.

Examples 9 to 46

Degreasing treatment was performed on a metal plate (SUS-301-H, thickness of 0.20 mm, manufactured by Sumitomo Metal Industries) using an alkaline degreasing agent (product name "Surf Cleaner 155", manufactured by Nippon Paint Co.). The thermosetting surface preparation agent I was applied onto both sides of the metal plate using a roll coater and then dried and heated under the conditions of a temperature of 300° C. and a duration of one minute to form a chemical coating layer with a thickness in a range of 1 μm to 2 μm.

The adhesive I (using anti-corrosive pigment with an average length of 3 μm) was applied onto the chemical coating layer and then dried and heated under the conditions of a temperature of 250° C. and a duration of two minutes to yield an adhesive layer with a thickness in a range of 2 μm to 5 μm (average of approximately 3 μm).

The rubber agent I was applied onto the adhesive layer and then dried and heated under the conditions of a temperature of 250° C. and a duration of two minutes to form a rubber coating layer. The 38 combinations of the thickness of the rubber coating layer and the universal hardness of the rubber coating layer listed in Table 5 were prepared.

By applying an aqueous solution including polytetrafluoroethylene onto the above-described rubber coating layer to form a lubricant layer with a thickness in a range of 0.5 μm to 3 μm, 38 types of metal gasket material plates 19 to 56 having a sealing layer consisting of a chemical coating layer, an adhesive layer, a rubber coating layer, and a lubricant layer on both sides of a steel plate and having a different

TABLE 4

| | Metal gasket material plate number | Chemical coating layer film thickness (μm) | Adhesive layer average length of anti-corrosive pigment (μm) | Adhesive layer amount of anti-corrosive pigment (% by weight) | Adhesive layer film thickness (μm) | Rubber coating layer film thickness (μm) | Rubber coating layer hardness (N/mm²) | Lubricant layer | Test results adhesion strength |
|---|---|---|---|---|---|---|---|---|---|
| Comparative Example 8 | 13 | 1-2 | 3 | 3 | 2-5 | 20 | 100 | none | poor |
| Example 6 | 14 | 1-2 | 3 | 10 | 2-5 | 20 | 100 | none | good |
| Example 7 | 15 | 1-2 | 3 | 18 | 2-5 | 20 | 100 | none | good |
| Example 8 | 16 | 1-2 | 3 | 30 | 2-5 | 20 | 100 | none | good |
| Comparative Example 9 | 17 | 1-2 | 3 | 48 | 2-5 | 20 | 100 | none | poor |
| Comparative Example 10 | 18 | 1-2 | 3 | 60 | 2-5 | 20 | 100 | none | poor |

Figure 8:
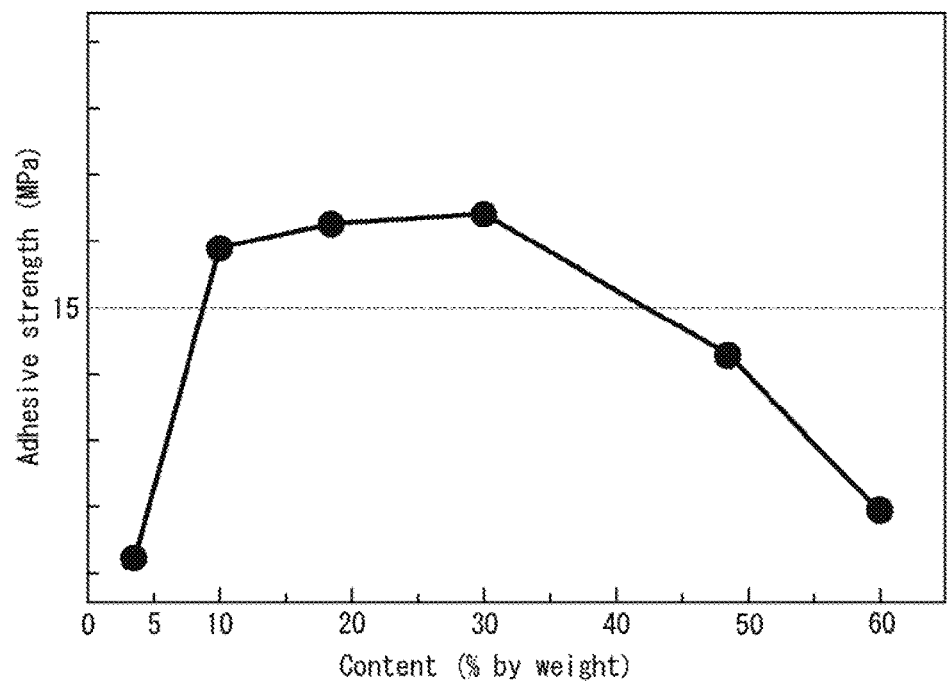
FIG. 8 is a graph of the results of an adhesion strength test on metal gasket material plates 13 to 18.

When the proportion of the anti-corrosive pigment was 10% to 30% by weight, the adhesion strength was excellent. Conversely, when the blending proportion was 48% by weight, the adhesion strength fell slightly below 15 MPa. The adhesion strength was low when the blending proportion was either small or large. FIG. 8 illustrates the test results.

thickness of the rubber coating layer and universal hardness of the rubber coating layer were prepared.

Using the 38 types of metal gasket material plates 19 to 56, the combustion gas sealing performance was measured with the following nitrogen gas seal test. Furthermore, using the 38 types of metal gasket material plates 19 to 56, the wear resistance due to thermal fluctuation (fretting performance) was evaluated by the following wear test.

Figure 9:
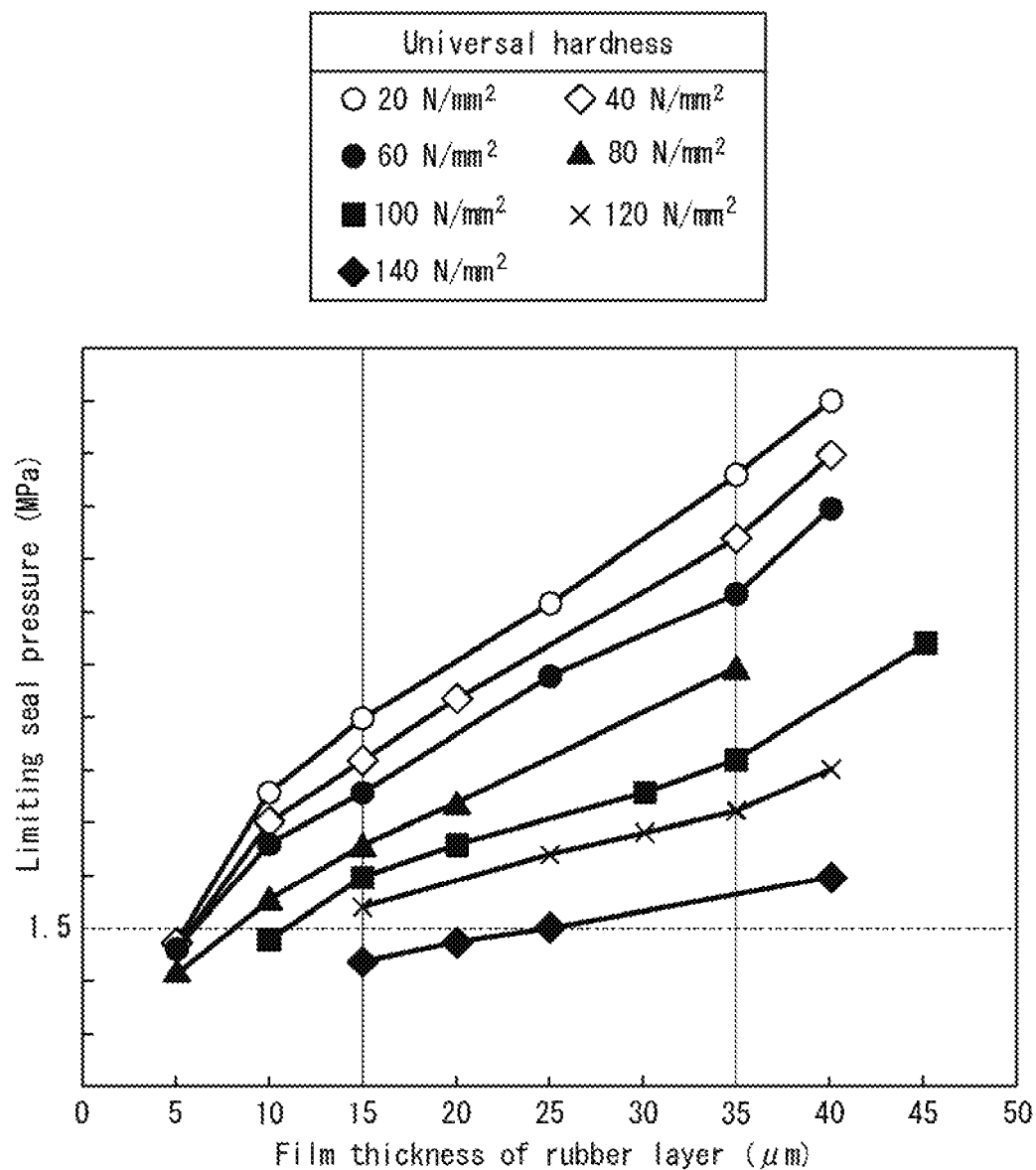
FIG. 9 is a graph of the results of a nitrogen gas seal test on metal gasket material plates 19 to 56.

Table 5 and FIG. 9 illustrate the evaluation results.

(Nitrogen Gas Seal Test)

Figure 2A:
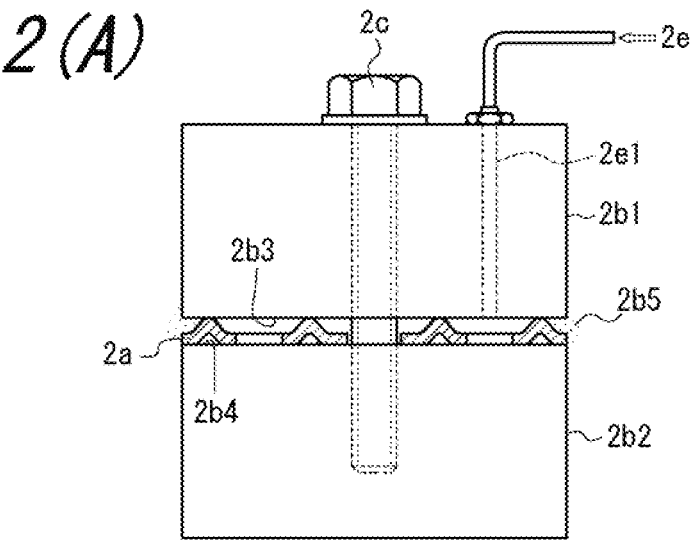
FIGS. 2(A) to 2(C) illustrate a nitrogen gas seal test, FIG. 2(A) being a schematic diagram of a tester in which a metal gasket material plate is sandwiched by aluminum jigs, FIG. 2(B) being a schematic diagram (plan view) representing the shape of the metal gasket material plate, and FIG. 2(C) being an expanded view (cross-sectional diagram) of a portion around an opening (2d2) in the metal gasket material plate through which nitrogen gas passes.

As illustrated in FIG. 2(A), one metal gasket material plate (2a) was disposed between sample clamping surfaces (2b3, 2b4) yielded by finishing two aluminum jigs (2b1, 2b2) to a roughness of 12.5 s. A clamping bolt (2c) was then tightened to a linear pressure of 45 N/mm to sandwich the metal gasket material plate 2a. As indicated by the arrows in FIG. 2(C), pressure was applied with a pressure unit (2e) by supplying nitrogen gas through an opening (2e1) in the aluminum jig and the opening (2d2) in the metal gasket material plate. When applying pressure, soapy water was sprayed all around the sample clamping surfaces (2b3, 2b4) of the aluminum jigs (2b1, 2b2) sandwiching the metal gasket material plate (2a), and the applied pressure immediately before a bubble occurred at the edge (2b5) of the sample clamping surfaces was measured as the seal limit.

Figure 2B:
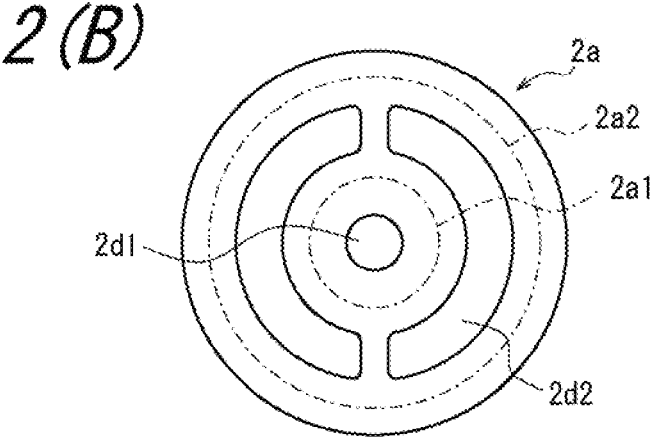
Figure 2C:
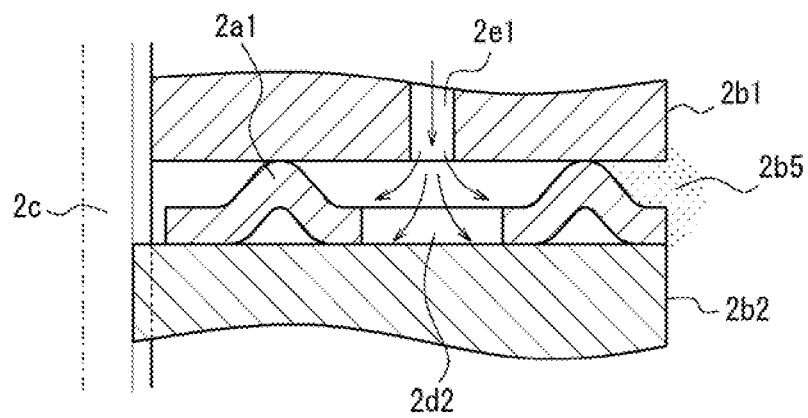

As illustrated in FIG. 2(B), the metal gasket material plate 2a includes a bolt hole (2d1) surrounded by an inner full embossment (2a1) and an opening (2d2) surrounded by the inner full embossment (2a1) and an outer full embossment (2a2). The gas sealing performance was evaluated with the following standard, taking the limiting seal pressure to be the gas pressure (MPa) before leakage of nitrogen gas supplied by being injected from the pressure unit (2e) through the gas passage (2e1) into the opening (2d2).

For use in or around an internal combustion engine (such as for cylinder heads in an automobile), the limiting seal pressure is preferably 1.5 MPa or greater. Therefore, ensuring a limiting seal pressure of 1.5 MPa was thus set as the goal. Examples with a limiting seal pressure of 1.5 MPa or greater were evaluated as good, and those not ensuring a sufficient limiting seal pressure (less than 1.5 MPa) as poor. Only good products were considered acceptable.

TABLE 5

| | Metal gasket material plate number | Chemical coating layer film thickness (μm) | Adhesive layer average length of anti-corrosive pigment (μm) | Adhesive layer amount of anti-corrosive pigment (% by weight) | Adhesive layer film thickness (μm) | Rubber coating layer film thickness (μm) | Rubber coating layer hardness (N/mm$^2$) | Lubricant layer film thickness (μm) | Test results gas sealing performance | Test results wear resistance |
|---|---|---|---|---|---|---|---|---|---|---|
| Example 9 | 19 | 1-2 | 3 | 20 | 2-5 | 5 | 20 | 0.5-3 | poor | — |
| Example 10 | 20 | 1-2 | 3 | 20 | 2-5 | 10 | 20 | 0.5-3 | good | poor |
| Example 11 | 21 | 1-2 | 3 | 20 | 2-5 | 15 | 20 | 0.5-3 | good | good |
| Example 12 | 22 | 1-2 | 3 | 20 | 2-5 | 25 | 20 | 0.5-3 | good | good |
| Example 13 | 23 | 1-2 | 3 | 20 | 2-5 | 35 | 20 | 0.5-3 | good | good |
| Example 14 | 24 | 1-2 | 3 | 20 | 2-5 | 40 | 20 | 0.5-3 | good | poor |
| Example 15 | 25 | 1-2 | 3 | 20 | 2-5 | 5 | 40 | 0.5-3 | poor | — |
| Example 16 | 26 | 1-2 | 3 | 20 | 2-5 | 10 | 40 | 0.5-3 | good | good |
| Example 17 | 27 | 1-2 | 3 | 20 | 2-5 | 15 | 40 | 0.5-3 | good | good |
| Example 18 | 28 | 1-2 | 3 | 20 | 2-5 | 20 | 40 | 0.5-3 | good | good |
| Example 19 | 29 | 1-2 | 3 | 20 | 2-5 | 35 | 40 | 0.5-3 | good | good |
| Example 20 | 30 | 1-2 | 3 | 20 | 2-5 | 40 | 40 | 0.5-3 | good | poor |
| Example 21 | 31 | 1-2 | 3 | 20 | 2-5 | 5 | 60 | 0.5-3 | poor | — |
| Example 22 | 32 | 1-2 | 3 | 20 | 2-5 | 10 | 60 | 0.5-3 | good | good |
| Example 23 | 33 | 1-2 | 3 | 20 | 2-5 | 15 | 60 | 0.5-3 | good | good |
| Example 24 | 34 | 1-2 | 3 | 20 | 2-5 | 25 | 60 | 0.5-3 | good | good |
| Example 25 | 35 | 1-2 | 3 | 20 | 2-5 | 35 | 60 | 0.5-3 | good | good |
| Example 26 | 36 | 1-2 | 3 | 20 | 2-5 | 40 | 60 | 0.5-3 | good | good |
| Example 27 | 37 | 1-2 | 3 | 20 | 2-5 | 5 | 80 | 0.5-3 | poor | — |
| Example 28 | 38 | 1-2 | 3 | 20 | 2-5 | 10 | 80 | 0.5-3 | good | good |
| Example 29 | 39 | 1-2 | 3 | 20 | 2-5 | 15 | 80 | 0.5-3 | good | excellent |
| Example 30 | 40 | 1-2 | 3 | 20 | 2-5 | 20 | 80 | 0.5-3 | good | excellent |
| Example 31 | 41 | 1-2 | 3 | 20 | 2-5 | 35 | 80 | 0.5-3 | good | excellent |
| Example 32 | 42 | 1-2 | 3 | 20 | 2-5 | 10 | 100 | 0.5-3 | poor | — |
| Example 33 | 43 | 1-2 | 3 | 20 | 2-5 | 15 | 100 | 0.5-3 | good | excellent |
| Example 34 | 44 | 1-2 | 3 | 20 | 2-5 | 20 | 100 | 0.5-3 | good | excellent |
| Example 35 | 45 | 1-2 | 3 | 20 | 2-5 | 30 | 100 | 0.5-3 | good | excellent |
| Example 36 | 46 | 1-2 | 3 | 20 | 2-5 | 35 | 100 | 0.5-3 | good | excellent |
| Example 37 | 47 | 1-2 | 3 | 20 | 2-5 | 45 | 100 | 0.5-3 | good | good |
| Example 38 | 48 | 1-2 | 3 | 20 | 2-5 | 15 | 120 | 0.5-3 | good | excellent |
| Example 39 | 49 | 1-2 | 3 | 20 | 2-5 | 25 | 120 | 0.5-3 | good | excellent |
| Example 40 | 50 | 1-2 | 3 | 20 | 2-5 | 30 | 120 | 0.5-3 | good | excellent |
| Example 41 | 51 | 1-2 | 3 | 20 | 2-5 | 35 | 120 | 0.5-3 | good | excellent |
| Example 42 | 52 | 1-2 | 3 | 20 | 2-5 | 40 | 120 | 0.5-3 | good | good |
| Example 43 | 53 | 1-2 | 3 | 20 | 2-5 | 15 | 140 | 0.5-3 | poor | — |
| Example 44 | 54 | 1-2 | 3 | 20 | 2-5 | 20 | 140 | 0.5-3 | poor | — |
| Example 45 | 55 | 1-2 | 3 | 20 | 2-5 | 25 | 140 | 0.5-3 | poor | — |
| Example 46 | 56 | 1-2 | 3 | 20 | 2-5 | 40 | 140 | 0.5-3 | good | — |

When the universal hardness was high and the film thickness of the rubber coating layer was large, better gas sealing performance (more stable gas sealing performance) was obtained than when the universal hardness was low and the film thickness of the rubber coating layer was small. Specifically, stable gas sealing performance was obtained in the gasket material plate in each of the following cases: universal hardness of 20, 40, 60 or 80 N/mm$^2$ and rubber film thickness of 10 μm or greater; universal hardness of 100 or 120 N/mm$^2$ and rubber film thickness of 15 μm or greater; and universal hardness of 140 N/mm$^2$ and rubber film thickness of 40 μm or greater.

When using the metal gasket material plate for a cylinder head including a rubber coating layer with a low universal hardness in an actual engine, the wear resistance of the rubber coating layer is low, and due to fretting caused by the cooling and heating cycle of cooling and heating between the bonding surfaces of the engine and the gasket, a flow may easily occur in the rubber portion. As a result, the rubber coating layer may become thin. In the worst case, the metal plate may be exposed between the adhesive layer and the rubber coating layer, and the micro sealing performance that the rubber coating layer should maintain may be lost. At worst, the combustion gas may penetrate into the cooling water.

For use in or around an internal combustion engine (such as for cylinder heads in an automobile), the limiting seal pressure is preferably 1.5 MPa or greater, and therefore the following wear resistance test was performed on metal gasket material plates for which the limiting seal pressure was 1.5 MPa or greater in the above-described nitrogen gas seal test. Gasket material plates having stable wear resistance and also stable gas sealing performance were thus confirmed.

For a universal hardness of 140 N/mm$^2$, the rubber film thickness needs to be 25 μm or greater in order to ensure that the limiting seal pressure is 1.5 MPa or greater. Hence, this rubber hardness was deemed to be too hard for use in a metal gasket material plate and was excluded from the wear resistance test. Table 5 lists the evaluation results. Metal gasket material plates for which the wear resistance test was not performed are listed as "-" in Table 5.

(Wear Test)

Figure 5A:
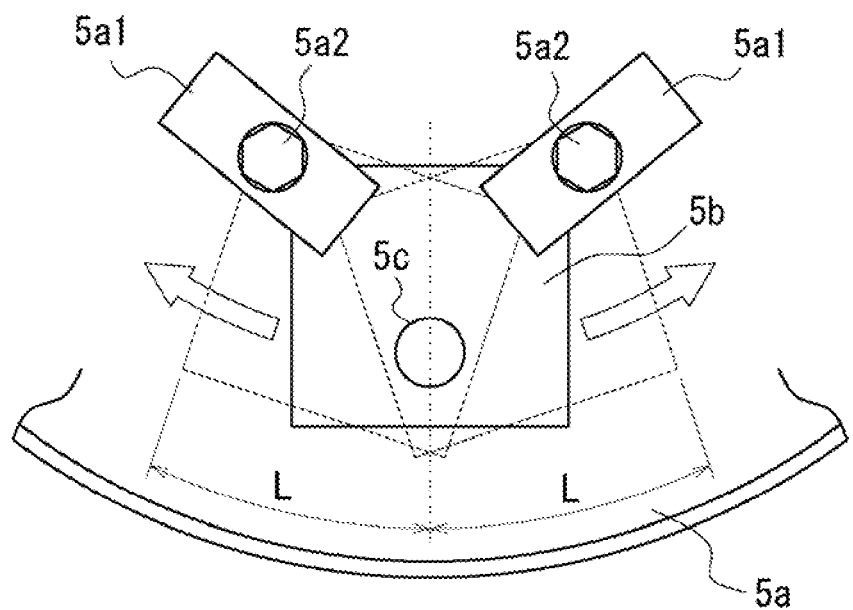
FIGS. 5(A) and 5(B) illustrate a wear test, FIG. 5(A) being a plan view, and FIG. 5(B) being a cross-sectional view.
Figure 5B:
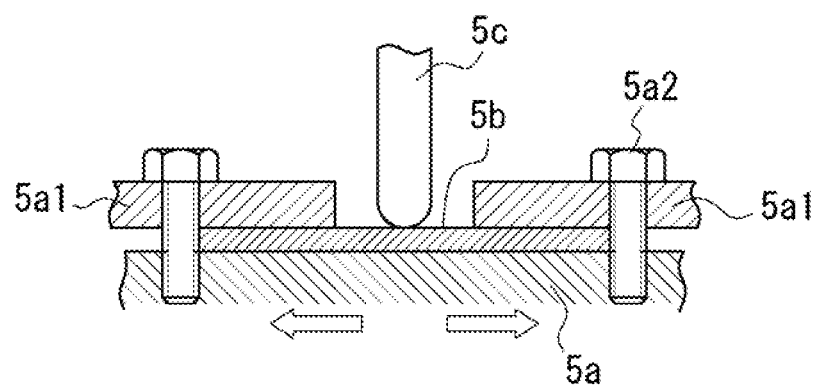

A metal gasket material plate (5b) was cut to a length of 50 mm and a width of 50 mm. As illustrated in FIGS. 5(A) and 5(B), the metal gasket material plate (5b) was secured on a turntable (5a), so as to be in contact with the turntable (5a), by two set jigs (5a1) and two bolts (5a2).

After directly contacting a probe (5c) with a spherical tip having a roughness of Ra 0.5 to the rubber coating layer of the metal gasket material plate (5b) with a load of 5000 g, the turntable (5a) was moved reciprocally over a certain distance (L) at a constant speed of 60 mm/s. The number of reciprocal movements until the sealing layer completely peeled off so as to completely expose the metal surface of the metal plate was recorded.

At the time of reciprocal movement, the turntable (metal gasket material plate (5b)) was moved reciprocally without displacing the probe, as illustrated in FIG. 5(A). In FIG. 5(A) and FIG. 5(B), the arrows represent the direction of movement of the turntable.

For use in or around an internal combustion engine (such as for cylinder heads in an automobile), the number of reciprocal movements until the metal surface is exposed is preferably 500 or greater. Therefore, metal gasket material plates for which the number of reciprocal movements was 1000 or greater were evaluated as excellent, metal gasket material plates for which the number of reciprocal movements was 500 or greater to less than 1000 as good, and metal gasket material plates for which the number of reciprocal movements was less than 500 as poor.

At a universal hardness of 20 N/mm$^2$, the metal plate was exposed at an early stage for a rubber film thickness of 10 μm and 40 μm, whereas the wear resistance was good for a rubber film thickness of 15 μm to 35 μm. At a universal hardness of 40 N/mm$^2$, the metal plate was exposed at an early stage for a rubber film thickness of 40 μm, whereas the wear resistance was good for a rubber film thickness of 10 μm to 35 μm.

At a universal hardness of 60 N/mm$^2$ and 80 N/mm$^2$, the wear resistance was good for a rubber film thickness of 10 μm or greater. At a universal hardness of 100 N/mm$^2$ and 120 N/mm$^2$, the wear resistance was good for a rubber film thickness of 15 μm or greater.

In particular, at a universal hardness of 80 N/mm$^2$, 100 N/mm$^2$, and 120 N/mm$^2$, the wear resistance was excellent for a rubber film thickness of 15 μm to 35 μm, as the metal plate was not exposed even after 1000 reciprocal movements.

The gas sealing performance and wear resistance were good at a universal hardness of 20 N/mm$^2$ and a rubber film thickness of 15 μm to 35 μm, a universal hardness of 40 N/mm$^2$ and a rubber film thickness of 10 μm to 35 μm, a universal hardness of 60 N/mm$^2$ and a rubber film thickness of 10 μm to 40 μm, a universal hardness of 80 N/mm$^2$ and a rubber film thickness of 10 μm to 35 μm, a universal hardness of 100 N/mm$^2$ and a rubber film thickness of 15 μm to 45 μm, and a universal hardness of 120 N/mm$^2$ and a rubber film thickness of 15 μm to 40 μm.

From these results, the gas sealing performance and wear resistance were determined to be good for a rubber film thickness of 15 μm to 35 μm and a universal hardness of the rubber coating layer of 20 N/mm$^2$ to 120 N/mm$^2$.

Example 47

A metal gasket material plate 57 having a sealing layer on both sides of a metal plate was prepared in a similar way to Example 9, except that the thickness of the rubber coating layer was 20 μm, the universal hardness of the rubber coating layer was 100 N/mm$^2$, and a sealing layer was formed on only one side of the metal plate.

Using the metal gasket material plate 57, the following LLC resistance immersion test, oil resistance immersion test, and fuel oil resistance immersion test were performed to evaluate the durability with respect to cooling water (LLC), lubricant oil, and fuel oil.

(Cooling Water Resistance Immersion Test)

The metal gasket material plate 57 was cut to a length of 75 mm and a width of 15 mm. The metal gasket material plate 57 was then placed in a container filled with a 100% concentration of LLC. The container was placed in a mantle heater for immersion at a temperature of 100° C. for 120 hours.

During immersion, the container was left open to the air. Even if the LLC that was the test liquid evaporated due to the immersion temperature, however, the LLC liquefied in a siphon and then returned to the container. Hence, the concentration and temperature of the liquid and the pressure inside the container did not change.

The adhesion strength test was performed and the cooling water resistance was evaluated using the metal gasket material plate after immersion.

(Lubricant Oil Resistance Immersion Test)

The metal gasket material plate 57 was cut to a length of 75 mm and a width of 15 mm. The metal gasket material plate 57 was then placed in a container filled with HS IRM903 liquid, and the container was loosely covered and placed in an electric oven.

The electric oven was then turned on for immersion at a temperature of 150° C. for 120 hours. The adhesion strength test was performed and the lubricant oil resistance was evaluated using the metal gasket material plate after immersion.

(Fuel Oil Resistance Immersion Test)

The metal gasket material plate 57 was cut to a length of 75 mm and a width of 15 mm. The metal gasket material plate 57 was then placed in a container filled with ASTM Fuel C liquid, and the container was loosely covered.

The metal gasket material plate 57 was then immersed at room temperature (approximately 25° C.) for 120 hours. The adhesion strength test was performed and the fuel oil resistance was evaluated using the metal gasket material plate after immersion.

In the tests of cooling water resistance, lubricant oil resistance, and fuel oil resistance, an adhesion strength of 10 MPa or greater was evaluated as good. Table 6 lists the evaluation results.

TABLE 6

| | | Adhesive layer | | | Rubber coating layer | | Lubricant layer | Test results | | |
|---|---|---|---|---|---|---|---|---|---|---|
| Metal gasket material plate number | Chemical coating layer film thickness (μm) | average length of anti-corrosive Pigment (μm) | amount of anti-corrosive pigment (% by weight) | film thickness (μm) | film thickness (μm) | hardness (N/mm²) | film thickness (μm) | cooling water resistance | lubricant oil resistance | fuel oil resistance |
| Example 47 | 57 | 1-2 | 3 | 20 | 2-5 | 20 | 100 | 0.5-3 | good | good | good |

The metal gasket material plate 57 had an excellent adhesion strength of 10 MPa or greater for all of cooling water resistance, lubricant oil resistance, and fuel oil resistance and thus had excellent durability with respect to LLC, lubricant oil, and fuel oil.

The invention claimed is:

1. A metal gasket material plate comprising:
   a sealing layer formed by layering a chemical coating layer, an adhesive layer, and a rubber coating layer in order on at least one side of a metal plate, wherein
   the chemical coating layer is formed by a thermosetting surface preparation agent including inorganic compound particles and a metal alkoxide compound,
   the adhesive layer is a layer with a thickness of 2 μm to 5 μm formed by an adhesive that includes at least one epoxy compound selected from the group consisting of a novolac epoxy compound, a bisphenol A epoxy compound, a bisphenol F epoxy compound, a cresol novolac epoxy compound, a naphthalene epoxy compound, a glycidyl ester epoxy compound, a glycidylamine epoxy compound, a heterocyclic epoxy compound, and a rubber-modified epoxy compound, and at least one anti-corrosive pigment selected from the group consisting of a phosphoric acid anti-corrosive pigment, a molybdic acid anti-corrosive pigment, and a phosphomolybdic acid anti-corrosive pigment,
   the rubber coating layer is formed by a rubber agent including rubber, and
   an average length of the anti-corrosive pigment is 0.5 μm to 4 μm, and a proportion of the anti-corrosive pigment is 10% to 30% by weight with respect to 100% by weight of the epoxy compound.

2. The metal gasket material plate of claim 1, wherein anti-corrosive pigment is substantially not included in the rubber coating layer.

3. The metal gasket material plate of claim 1, wherein a thickness of the chemical coating layer is 1 μm to 2 μm,
   the inorganic compound particles comprise at least one type of particle selected from the group consisting of silica, alumina, and titanium, and
   the metal alkoxide compound comprises at least one compound selected from the group consisting of titanate, a silane coupling agent, and aluminate.

4. The metal gasket material plate of claim 3, wherein the rubber is acrylonitrile butadiene rubber,
   a thickness of the rubber coating layer is 15 μm to 35 μm, and
   a universal hardness of the rubber coating layer in an ultra-microhardness tester is 20 N/mm² to 120 N/mm².

5. The metal gasket material plate of claim 4, wherein anti-corrosive pigment is substantially not included in the rubber coating layer.

6. The metal gasket material plate of claim 3, wherein anti-corrosive pigment is substantially not included in the rubber coating layer.

7. The metal gasket material plate of claim 1, wherein the rubber is acrylonitrile butadiene rubber,
   a thickness of the rubber coating layer is 15 μm to 35 μm, and
   a universal hardness of the rubber coating layer in an ultra-microhardness tester is 20 N/mm² to 120 N/mm².

8. The metal gasket material plate of claim 7, wherein anti-corrosive pigment is substantially not included in the rubber coating layer.

9. A method for manufacturing a metal gasket material plate, the method comprising:
   forming a chemical coating layer by applying a thermosetting surface preparation agent including inorganic compound particles and a metal alkoxide compound onto at least one side of a metal plate and then drying and heating the thermosetting surface preparation agent;
   forming an adhesive layer with a thickness of 2 μm to 5 μm by applying, onto the chemical coating layer, an adhesive that includes at least one epoxy compound selected from the group consisting of a novolac epoxy compound, a bisphenol A epoxy compound, a bisphenol F epoxy compound, a cresol novolac epoxy compound, a naphthalene epoxy compound, a glycidyl ester epoxy compound, a glycidylamine epoxy compound, a heterocyclic epoxy compound, and a rubber-modified epoxy compound, and at least one anti-corrosive pigment selected from the group consisting of a phosphoric acid anti-corrosive pigment, a molybdic acid anti-corrosive pigment, and a phosphomolybdic acid anti-corrosive pigment and then drying and heating the adhesive; and forming a rubber coating layer by applying a rubber agent including rubber onto the adhesive layer and then drying and heating the rubber agent, wherein
an average length of the anti-corrosive pigment is 0.5 µm to 4 µm, and a proportion of the anti-corrosive pigment is 10% to 30% by weight with respect to 100% by weight of the epoxy compound.

* * * * *